United States Patent [19]
Andersen et al.

[11] 3,982,852
[45] Sept. 28, 1976

[54] BORE VANE ASSEMBLY FOR USE WITH TURBINE DISCS HAVING BORE ENTRY COOLING

[75] Inventors: Richard H. Andersen; Carl R. Dins, both of Cincinnati; Frederick C. Herzner, Fairfield, all of Ohio

[73] Assignee: General Electric Company, Cincinnati, Ohio

[22] Filed: Nov. 29, 1974

[21] Appl. No.: 528,023

[52] U.S. Cl. .............................. 416/95; 416/214 A; 416/219 R
[51] Int. Cl.² .......................................... F01D 5/18
[58] Field of Search .................. 416/95–97, 416/214 A, 219; 415/114–116; 60/39.17, 39.2

[56] References Cited
UNITED STATES PATENTS

| | | | |
|---|---|---|---|
| 2,405,190 | 8/1946 | Darling | 60/39.17 |
| 2,812,157 | 11/1957 | Turunen et al. | 415/114 |
| 2,873,947 | 2/1959 | Perry | 416/95 X |
| 3,565,545 | 2/1971 | Bobo et al. | 416/96 X |
| 3,588,277 | 6/1971 | Howald et al. | 416/96 |
| 3,742,706 | 7/1973 | Klompas | 416/97 X |
| 3,749,514 | 7/1973 | Kelch et al. | 416/95 |

FOREIGN PATENTS OR APPLICATIONS

| | | | |
|---|---|---|---|
| 1,476,732 | 6/1970 | Germany | 416/96 |

*Primary Examiner*—Everette A. Powell, Jr.
*Attorney, Agent, or Firm*—Robert C. Lampe, Jr.; Derek P. Lawrence

[57] ABSTRACT

A bore vane assembly is adapted to be received within the annular passage formed between two axially displaced turbine disc halves so as to provide axial columnar support therebetween during high centrifugal loading. The bore vane assembly includes a plurality of axially extending vanes which provide the required support and which also serve to pump cooling fluid from a plenum into the turbine disc.

2 Claims, 7 Drawing Figures

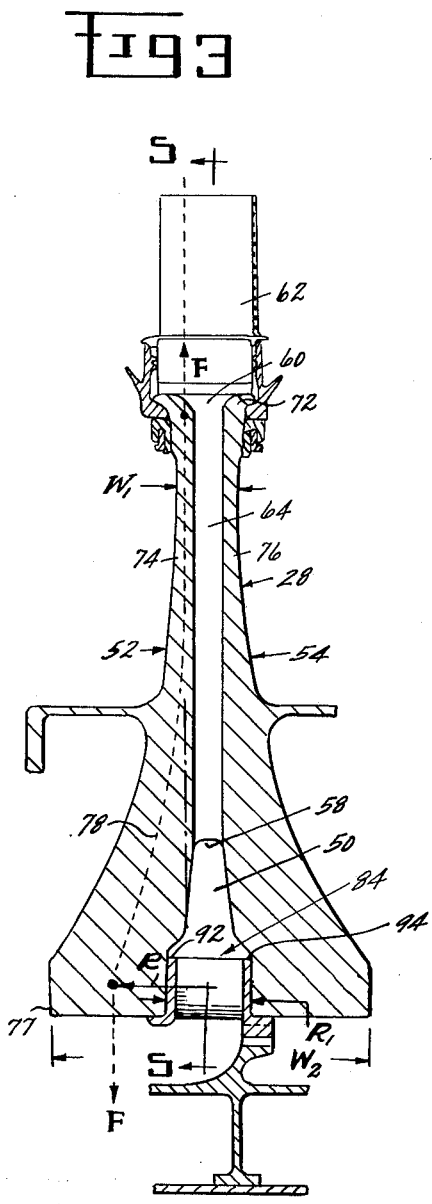
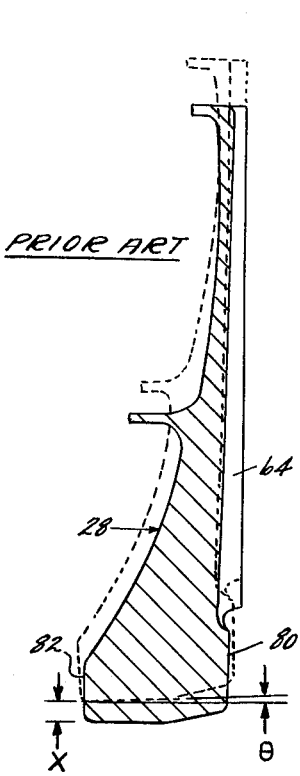
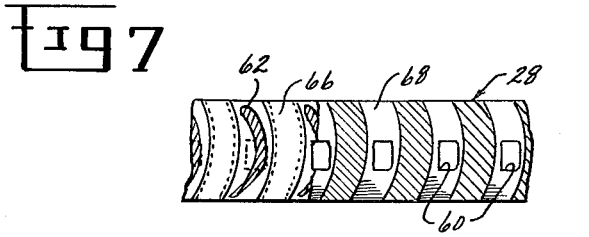
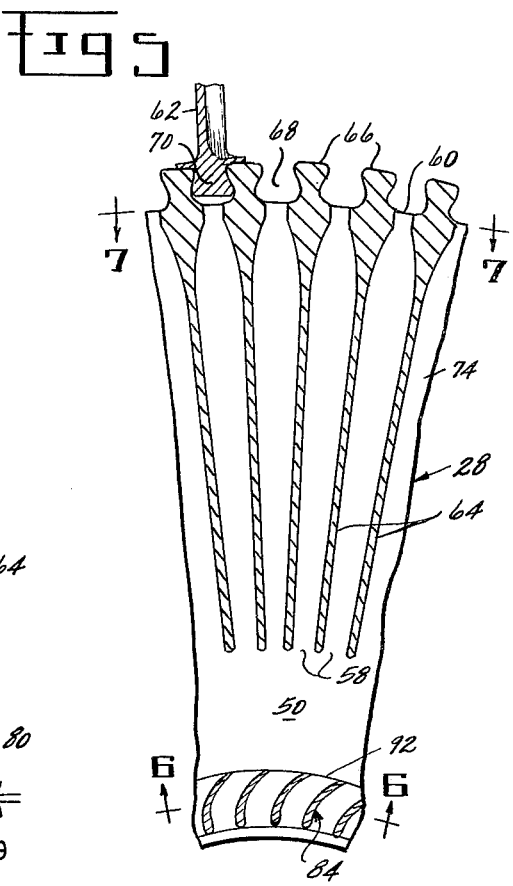
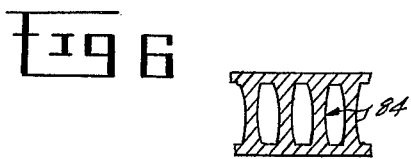

3,982,852

BORE VANE ASSEMBLY FOR USE WITH TURBINE DISCS HAVING BORE ENTRY COOLING

BACKGROUND OF THE INVENTION

This invention relates to gas turbine engines and, more particularly, to turbine cooling systems for use therein.

Gas turbine engine efficiency is a function of several engine parameters, among them being the temperatures achievable within combustion chambers as well as the amount of air which is extracted from the engine cycle to perform various cooling functions within the engine. The former improves engine cycle efficiency while the latter is detrimental to overall engine performance. Efficiency may also suffer due to excessive amounts of air loss as a result of leakage through malfitting seals. Additionally, the structural integrity of an engine is improved if structural loads are carried by elements of the engine which are not subjected to high temperatures and attendant thermal stresses. The problem is compounded when engine rotational speeds are increased, thus further stressing the structural members. Therefore, the engine designer is continuously faced with a balancing problem of how to increase combustion temperatures and engine rotational speeds in an effort to improve cycle efficiency and yet maintain acceptable stress levels in components subjected to high temperatures and centrifugal loading.

Traditionally, improved methods have been sought to provide improved cooling to the turbine portion of a gas turbine engine, that portion directly downstream of the combustor and through which flow the hot gases of combustion. Accordingly, it has become popular to bleed relatively cool air from the compressor portion of the engine upstream of the combustor and route it rearward through turbine blades provided with circuitous passages in a well-known manner. Cooling is provided by thermal conduction and impingement on internal portions of the turbine blades, with the cooling air typically ejected through a plurality of apertures within the blade body, often so oriented as to provide a cooling film upon the blade airfoil surface. Thus, cooling of the turbine blade is accomplished in an effective manner.

A recently employed concept is that shown in U.S. Pat. No. 3,742,706 — Klompas, "Dual Flow Cooled Turbine Arrangement for Gas Turbine Engines," assigned to the same assignee as the present invention. Therein, cooling air is bled from the compressor portion through a compressor interstage bleed port and induced radially inwardly through a radial inflow pump. The cooling air passes through an enclosed rotatable annulus to the turbine section where it is drawn into the bore of a hollow turbine disc by means of a centrifugal pump comprising a system of radial vanes or ribs mounted therein. The cooling air is then ejected through the rim of the disc and into the cooperating bases of the turbine blades in the known manner.

However, due to high turbine loading requirements imposed on advanced turbines, the rotor rotational speed is extremely high, often between 25 and 50 percent higher compared to current production engines. This high speed rotation imparts centrifugal forces on all rotor components, these forces being up to twice as large as experienced on conventional engines. Because of this phenomena, a hollow bore entry disc such as advocated by Klompas is additionally required to demonstrate outstanding load-carrying capability while exhibiting the unusual hollow geometrical characteristics needed to deliver cooling air to the turbine blades. It has been discovered that extremely high rotational speeds advocated for such high speed turbines causes the radial vanes (or ribs) to be stressed compressively far in excess of the material capability.

The problem facing the gas turbine designer, therefore, is to provide a highly efficient cooling system for advanced, high speed, high temperature turbines wherein the disc rib compressive stresses are held to acceptable levels within the material limits.

SUMMARY OF THE INVENTION

The object of the present invention, therefore, is to provide an improved thermally responsive turbine disc capable of withstanding the high centrifugal loadings associated with high rotational speeds.

This and other objects and advantages will be more clearly understood from the following detailed description, the drawings and specific examples all of which are intended to be typical of rather than in any way limiting the scope of the present invention. Briefly stated, the above objective is attained by incorporating a unique structural bore vane assembly within the turbine disc which permits extremely high speed operation while still maintaining structural integrity of the disc. The disc is provided with an annular passage at its inward extremity fluidly connected to a plurality of radially extending passages which extend to the outer periphery of the disc, the passages in turn communicating with the individual turbine blades in the known manner. The necessary centrifugal pumping action is provided by a stage of disc bore vanes disposed within the annular passage, each vane extending axially across the passage thereby providing columnar support for both sides of the disc. This support counteracts the tendency of the disc halves to bend inward toward each other during high centrifugal loadings with attendant high stresses on the inner side of the disc halves, as will be explained hereafter.

The cooling air is taken into the disc bore vanes which pump and guide the cooling air in the required substantially radial direction. Again, when the air reaches the disc rim area, it is fed into the individual turbine blades in the known manner by means of cooperating holes in the bottom ends of the blade dovetails.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example in connection with the accompanying drawings, in which:

FIG. 3 is a cross-sectional view of the turbine assembly of FIG. 2 depicting specific geometric characteristics;

FIG. 4 is an enlarged partial cross-sectional view of a prior art rotor assembly depicting turbine rotor disc distortion under high centrifugal loadings;

FIG. 5 is a fragmentary view taken generally along line 5—5 of FIG. 3;

FIG. 6 is a fragmentary view taken generally along line 6—6 of FIG. 5; and

FIG. 7 is a fragmentary view taken generally along line 7—7 of FIG. 5.

DESCRIPTION OF THE PREFERRED EMBODIMENT

Figure 1:
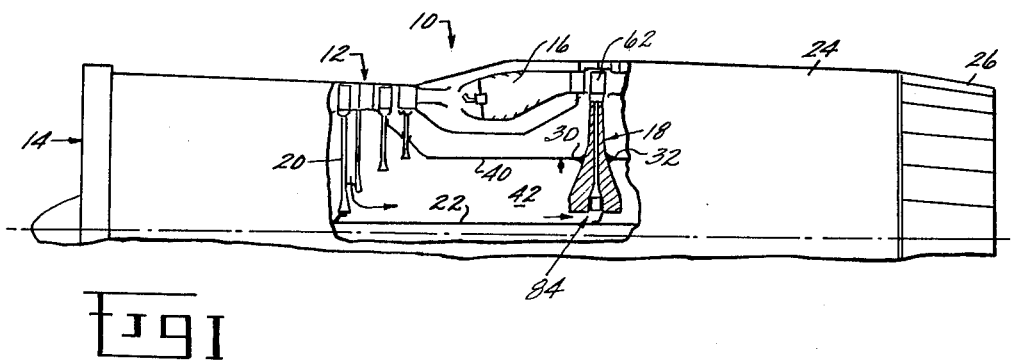
FIG. 1 is a schematic longitudinal section through a gas turbine engine embodying the subject invention.

Referring to the drawings wherein like numerals correspond to like elements throughout, reference is initially directed to FIG. 1 wherein an engine depicted generally at 10 embodying the present invention is diagrammatically shown. The engine 10 comprises an axial flow compressor 12 which pressurizes air entering inlet 14 to support combustion of fuel in combustor 16. The hot gas stream generated in the combustor 16 passes through and drives turbine 18 which, in turn, is drivingly connected to the rotor portion 20 of compressor 12 by shaft 22 in the usual manner of a gas turbine engine. The hot gas stream then enters an afterburner or reheat chamber 24 where additional fuel is selectively supplied and burned before the gas stream is discharged through a nozzle 26 to provide the propulsive force of the engine.

The above description is typical of many present-day engines and is not meant to be limiting, as it will become readily apparent from the following description that the present invention is capable of application to any gas turbine engine, and is not meant to be restricted to engines of the gas turbojet variety. For example, the subject invention is applicable to engines of the gas turbofan type and advanced mixed cycle engines as will be readily apparent to those skilled in the art. The above description of the engine depicted in FIG. 1 is, therefore, meant to be illustrative of one type of application.

Figure 2:
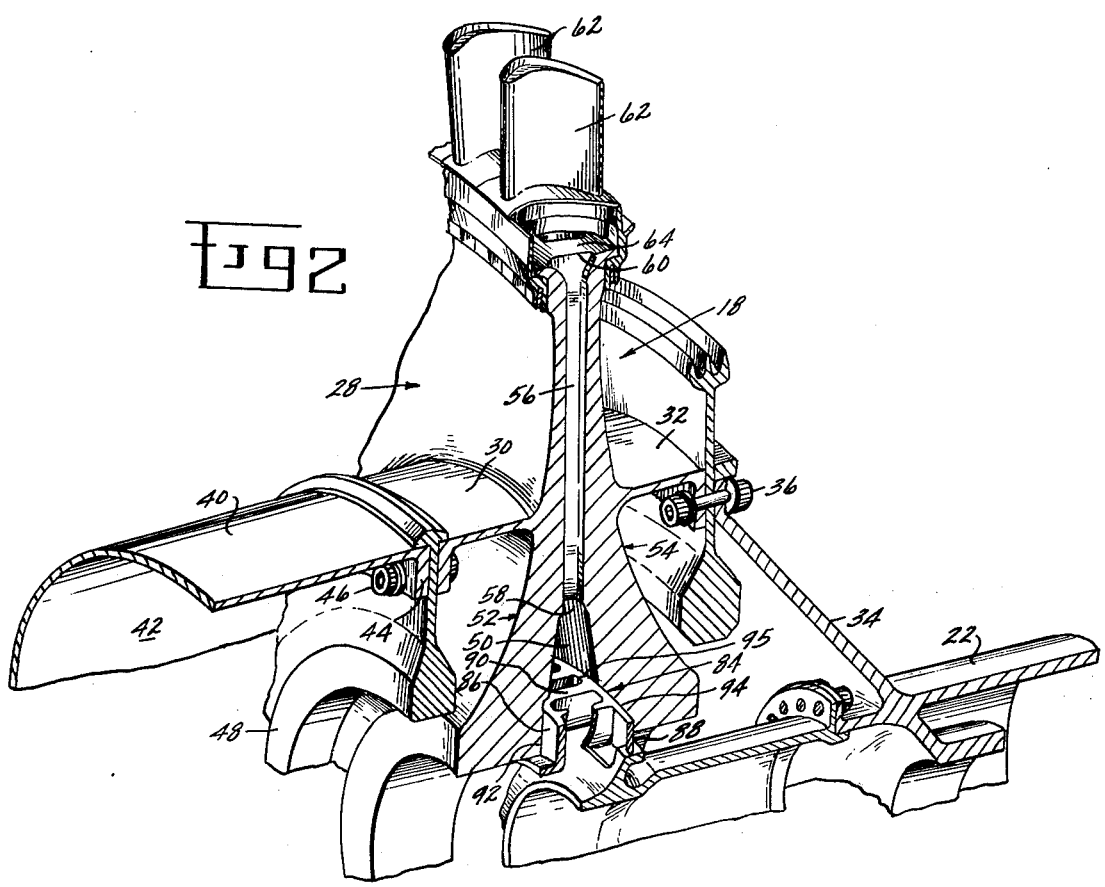
FIG. 2 is a sectioned, perspective view on an enlarged scale of a portion of the turbine rotor assembly of FIG. 1.

Referring now to FIG. 2, the turbine 18 is shown to include a rotatable disc 28 having formed therewith a forward and rearward facing pair of flanged cylindrical members 30 and 32, respectively. Turbine disc 28 is connected to a flanged frustoconical portion 34 of shaft 22 through bolted connection 36.

Compressor rotor 20 and turbine 18 are further connected by means of a second shaft 40 coaxial with shaft 22 and partially defining therebetween a chamber 42 (FIG. 1). Second shaft 40 has formed therewith an aft flange 44 which is rigidly affixed to flanged member 30 as by bolted connection 46. A disc structure 48 may be disposed between members 30 and 44 to provide structural rigidity to the rotatable outer shaft 40.

Turbine disc 28 has formed within, a circumferentially extending annular cavity 50 being in fluid communication with chamber 42. It is contemplated that the subject disc 28 could be formed of two separate halves, a forward half 52 and a rearward half 54, each formed to cooperate in defining cavity 50 and rigidly connected by known means or, alternatively, a unitized solid disc could be used with cavity 50 formed therein.

A plurality of circumferentially spaced and radially extending passages 56 are provided within the disc (only one being shown for clarity), each being in fluid communication with annular cavity 50 by means of an opening 58. Passages 56 terminate at openings 60 (FIG. 7) in the radially outward perimeter of disc 28, the openings being in fluid communication with cooperating holes of the inward end of a plurality of turbine blades 62 of the internally cooled variety disposed about the perimeter of disc 28 and affixed thereto in the known manner.

Ideally, the radial ribs 64 (FIG. 5) formed between adjacent pairs of passages 56 are aerodynamically contoured to constitute impeller vanes such that the disc has an internal centrifugal pumping capability. Further, the radial ribs 64 have formed thereon bulbous tenons 66, adjacent pairs of which cooperate to form dovetail slots 68 adapted to slidingly receive a cooperating dovetailed turbine blade root portion 70.

Referring now to FIG. 3, it can be appreciated that due to high rotational speeds, large centrifugal forces will be imparted to the turbine blades and all other rotating components. Centrifugal forces at the disc outer rim, created in part by the turbine blade 62, are transmitted down from the dovetail and disc rim area 72 of the disc through the radial ribs 64 and into the disc web areas generally denominated 74 and 76. Blade structure, cooling flow area and transition requirements between the blades and discs dictate the axial width $W_1$ of the disc in the upper web areas. The inner rim, or bore, 77 of the disc is significantly wider (width indicated as $W_2$) than the web area width $W_1$, the individual center line of the forward disc half 52 being depicted by broken line 78. (For illustrative purposes only the forward disc half center line is shown).

The force vector acting on the forward disc half outer portion and indicated as F is the centrifugal radial load due to the turbine blades 62 which is reacted to at its inner portion by a force on the bore 77 of equal and opposite magnitude. A similar loading exists on the rearward disc half. The force vector indicated as $R_1$ is the axial component of the reaction load on one disc half due to the other disc half through the radial ribs 64.

In the prior art configuration, the load $R_1$ was transmitted through the radial rib 64 to the opposite disc half, and vice versa. This created enormous compressive loads within the radial rib structure, stressing the ribs beyond their structural capability.

Related to this phenomena is the tendency of the individual disc halves to rotate and thereby move toward the disc center as indicated in phantom in FIG. 4. Bore rotation is indicated by the angle $\theta$ while radial displacement is indicated as X. As a result, the tangential stresses on the inner edge of each disc half (generally in the area of 80) far exceed those at the outer edge of the disc bore (the area generally denominated 82).

To alleviate the large axial variation in tangential stresses, Applicants incorporate a bore vane assembly 84 (FIGS. 2 and 3) within cavity 50 which counteracts the large axial forces $R_1$ on the lower bore area (FIG. 3) and thereby minimizes the bore rotation effect. As depicted in FIGS. 2, 5 and 6, the bore vane assembly 84 incorporates circumferentially extending forward and aft flanged hoops 86 and 88, respectively, having an integral plurality of circumferentially spaced, axially extending columnar vanes 90 therebetween. The vanes are aerodynamically contoured to scoop air from chamber 42 and impell it substantially radially outwardly thereby providing pumping means, and mechanically sized to resist the disc bending hereinbefore discussed. The vane assembly is inserted within recesses 92 and 94 of aperture 50 with its flanged surfaces abutting the radially inward disc rim. The bore vane assembly may be segmented into circumferentially extending sectors having an abutting relationship as at 95, thereby facilitating assembly procedures. A direct result of incorporation of this novel bore vane assembly is a more uniform distribution of tangential stress across the disc bore, thereby utilizing all of the bore material more effectively. More specifically, the bore vane concept permits the lowering of the disc rib compressive stresses to acceptable levels during high speed engine operation.

It should be obvious to one skilled in the art that certain changes can be made to the above-described invention without departing from the broad inventive concepts thereof. For example, it can be appreciated that in certain applications the pumping capability of the bore vane assembly 84 would be sufficient to eliminate the aerodynamic contouring of the radial rib 64 which serves as a centrifugal pump. It is intended that the appended claims cover these and all similar variations of the present invention's broader inventive concepts.

What is claimed is:

1. A rotor comprising:

two generally parallel annular discs for rotation about a common axis, the inner peripheries of said discs being substantially thicker than the outer peripheries thereof and axially displaced relative to each other;

a plurality of aerodynamically contoured ribs connected between said discs for pumping a cooling fluid radially outwardly, said ribs extending from a point intermediate the inner and outer peripheries, and each rib terminating in a bulbous tenon, adjacent pairs of which each cooperate to retain the root portion of a turbomachinery blade therebetween; and nonintegral, aerodynamically contoured bore vanes inserted between said discs, each vane having its longitudinal axis generally parallel to the disc rotational axis and its chord extending from the disc inner periphery to a location radially inwardly of said ribs thereby partially defining a cavity between said vanes and said ribs, said vanes further contoured to receive the cooling air from the generally radial direction and turn the cooling fluid tangentially into the cavity in substantial alignment with said ribs; the number of bore vanes being less than the number of ribs and sized to provide axial columnar structural support between said discs to substantially reduce compressive stresses in said ribs due to centrifugal forces tending to rotate the thick disc inner peripheries toward each other.

2. The rotor as recited in claim 1 wherein said bore vanes are fabricated with integral hoop segments at the vane longitudinal extremities, the hoop segments having an inner diameter substantially equal to the inner periphery of said discs and radially extending faces inserted between, and in contact with, said discs.

* * * * *